United States Patent Office 3,394,128
Patented July 23, 1968

3,394,128
19 - HALO - ANDROSTANE AND PREGNANE DERIVATIVES AND PROCESSES FOR THE PREPARATION THEREOF
John Edwards, Palo Alto, Calif., assignor to Syntex Corporation, Panama, Panama, a corporation of Panama
No Drawing. Continuation-in-part of application Ser. No. 314,523, Oct. 7, 1963. This application May 21, 1965, Ser. No. 457,793
Claims priority, application Mexico, Sept. 26, 1964, 79,067
19 Claims. (Cl. 260—239.55)

This application is a continuation-in-part of my copending application Ser. No. 314,523, filed Oct. 7, 1963, now abandoned.

The present invention relates to a novel process for the production of cyclopentanophenanthrene derivatives and to novel cyclopentanophenanthrene compounds.

More particularly, the present invention relates to a novel process for the preparation of 19-halo steroids of the androstane and pregnane series, especially those corresponding to the general formulae:

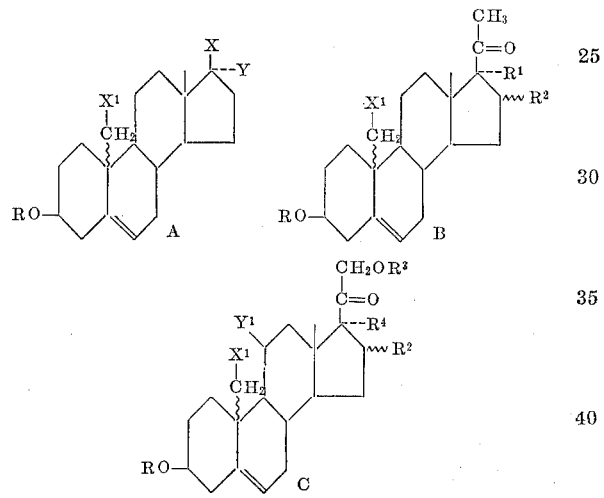

In these formulas, R represents hydrogen or a hydrocarbon carboxylic acyl group containing less than 12 carbon atoms, e.g., an acetyl group; $R^1$ represents hydrogen, hydroxyl or a hydrocarbon carboxylic acyloxy group containing less than 12 carbon atoms; $R^2$ represents hydrogen, $\alpha$-methyl, $\beta$-methyl, $\alpha$-hydroxyl or an $\alpha$-acyloxy group containing less than 12 carbon atoms; $R^3$ represents hydrogen or a hydrocarbon carboxylic acyl group of less than 12 carbon atoms; $R^4$ represents a hydroxyl group or an acyloxy group of less than 12 carbon atoms; $R^1$ and $R^2$, and $R^4$ and $R^2$, taken together can also represent the grouping:

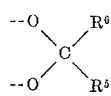

wherein $R^6$ and $R^5$ can each represent hydrogen or a lower hydrocarbon residue, e.g., a lower alkyl (including cycloalkyl) group containing up to 10 carbon atoms such as methyl, ethyl, propyl, isobutyl, cyclobutyl, cyclopentyl, cyclohexyl, cyclodecyl, and the like, a monocyclic aryl hydrocarbon (including alkaryl and aralkyl) group containing up to 10 carbon atoms, such as phenyl, benzyl, dimethylbenzyl, methylethylbenzyl, and the like, or a monocyclic heterocyclic group such as furfuryl, thiophenyl, and the like; $R^4$ and —$OR^3$ together with the 20-keto group can also represent a 17,20;20,21-bismethylenedioxy grouping; X represents hydroxyl or a hydrocarbon carboxylic acyloxy group containing less than 12 carbon atoms; Y represents hydrogen or a lower alkyl, e.g., methyl; lower alkenyl, e.g., vinyl; or lower alkinyl, e.g., ethinyl, group; X and Y taken together can also represent a keto group; $X^1$ represents fluorine, chlorine or bromine; $Y^1$ represents hydrogen, $\beta$-hydroxyl or a keto group; and indicates that the group attached thereby to the rest of the nucleus may have $\alpha$ or $\beta$ configuration.

Another particular object of the present invention are the compounds represented by the following formulae:

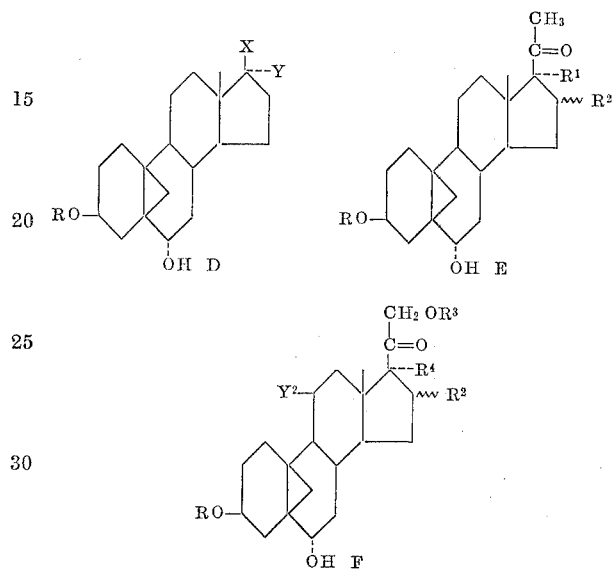

In the above formulae, R, $R^1$, $R^2$, $R^3$, $R^4$, X and Y have the same meaning as set forth hereinbefore; and $Y^2$ represents a keto group or hydrogen.

The acyl and acyloxy groups are derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, proprionate, enanthate, benzoate, trimethylacetate, t-butylacetate, phenoxyacetate, cyclopentylpropionate, aminoacetate, and $\beta$-chloropropionate.

The 19-halo-$\Delta^5$-3-acyloxy or hydroxy steroids obtained by the process of the present invention are valuable intermediates for the preparation of the corresponding 19-halo-$\Delta^4$-3-ones which, as disclosed in copending applications Ser. Nos. 246,015 filed Dec. 20, 1962 now U.S. Patent No. 3,210,389, 328,474 and 328,525 filed Dec. 6, 1963 now U.S. Patent Nos. 3,186,988 and 3,228,932, respectively, and 201,799 filed June 12, 1962, now U.S. Patent No. 3,101,356, granted August 20, 1963, are valuable therapeutic compounds. The 19-halo-$\Delta^5$-3-acyloxy steroids are readily converted to the corresponding 19-halo-$\Delta^4$-3-ones by first saponifying them with a base, e.g., an aqueous solution of sodium hydroxide, potassium carbonate, or the like, to produce the corresponding 19-halo-$\Delta^5$-3$\beta$-ols, and then subjecting the latter compounds to conventional Oppenauer oxidation, e.g., using aluminum isopropoxide in anhydrous toluene at reflux temperature, or by direct Oppenauer oxidation of the 19-halo-$\Delta^5$-3-acyloxy steroids to the corresponding 19-halo-$\Delta^4$-3-ones. In the cases of the 19-halo-$\Delta^5$-3-acyloxy or hydroxy pregnenes of Formula C above wherein $Y^1$ represents a keto group, this 11-keto group can be reduced by conventional procedures, e.g., by using sodium borohydride in methanol, to provide the corresponding 11β-hydroxy steroids. This reaction will be carried out after the introduction of the halogen atom at the 19-position, and preferably will be accomplished prior to removing protective groupings, e.g., a 17,20;20,21-bismethylenedioxy group, from the 11-keto starting material. Similarly, an 11β-hydroxyl group can be introduced into the 19-halo-Δ⁵-3-acyloxy or hydroxy pregnenes of Formula C above wherein Y¹ represents hydrogen by known microbiological methods, e.g., by incubation with adrenal glands in a suitable medium, such as an aqueous solution of alkali metal phosphates and chlorides admixed with magnesium sulfate and with an aqueous solution of fumaric acid and sodium hydroxide, for approximately 3 hours at from about 28° C. to about 37° C. This reaction can be carried out either before or after protective groupings have been removed from the hydroxyl groups in the 19-halo-Δ⁵-3-acyloxy pregnene starting material.

In addition the 19-halo-Δ⁵-3-acyloxy or hydroxy androstanes of Formula A above, i.e., the 19-halo-Δ⁵-androsten-3β-ol-17-one compounds and the corresponding 17α-lower (alkyl, alkenyl and alkinyl)-17β-ols obtained therefrom by conventional treatment with a lower (alkyl, alkenyl or alkinyl) magnesium halide, and the 19-halo-Δ⁵-3-acyloxy or hydroxy pregnenes of Formula B above, are themselves valuable therapeutic compounds as partially disclosed in copending applications Ser. Nos. 194,717, filed May 14, 1962, now U.S. Patent No. 3,124,574, and 201,803, filed June 12, 1962, now U.S. Patent No. 3,101,357.

The compounds represented by Formulae D, E and F, in addition to being important intermediates in the production of the 19-halo-Δ⁵-10β-steroid-3-ol derivatives indicated hereinbefore, have per se valuable therapeutic properties, i.e. they exhibit, respectively, androgenic-anabolic, progestational and anti-inflammatory activities. These novel compounds may be prepared from the corresponding 3,19-dihydroxy-Δ⁵-steroid 3-acylates by the process exemplified by the following scheme, wherein for the sake of simplicity, only the A and B rings are represented:

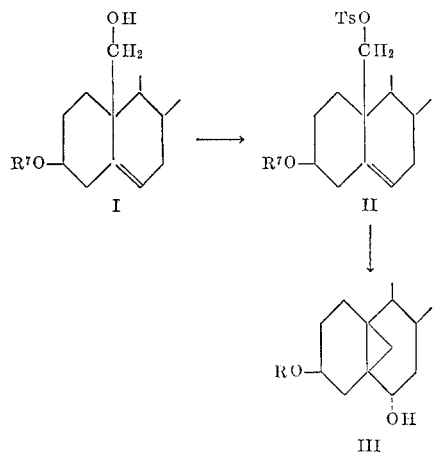

In the above formulae, R has the same meaning as set forth hereinbefore; and R⁷ represents a hydrocarbon carboxylic acyl group of less than 12 carbon atoms.

The starting compounds for the process depicted hereinbefore (I) are 3,19-dihydroxy-Δ⁵-10β-steroid 3-acylates of the androstane or pregnane series and may be prepared according to Bowers U.S. Patent No. 3,056,228. Free hydroxyl groups other than the 19-hydroxyl group in these starting materials will be protected prior to subjecting the steroid to the process of the present invention. This can be accomplished by acylating the hydroxyl groups to be protected, preferably before the introduction of the 19-hydroxyl group, and in fact this is the preferred means of protecting hydroxyl groups at the 3-position in both the androstanes and pregnanes as well as hydroxyl groups at the 17-position in the androstanes. Free hydroxyl groups at the 17- and 21-positions in the pregnane starting materials can also be protected by forming the corresponding 17,20;20,21-bismethylenedioxy derivatives, and a pair of free hydroxyl groups at the 16α,17α-positions can also be protected by forming an acetal or ketal derivative thereof, e.g., the corresponding 16α,17α-acetonide.

An illustrative but by no means exhaustive listing of 19-hydroxy androstanes and pregnanes which can be employed as starting materials in the process of the present invention includes:

Δ⁵-androstene-3β,17β,19-triol 3,17-diacetate,
17α-methyl-Δ⁵-androstene-3β,17β,19-triol 3,17-diacetate,
17α-vinyl-Δ⁵-androstene-3β,17β,19-triol 3,17-dipropionate,
17α-ethinyl-Δ⁵-androstene-3β,17β,19-triol 3-acetate 17-propionate,
Δ⁵-androstene-3β,19-diol-17-one 3-acetate,
Δ⁵-pregnene-3β,19-diol-20-one 3-acetate,
Δ⁵-pregnene-3β,17α,19-triol-20-one 3,17-diacetate,
16α,17α-isopropylidenedioxy-Δ⁵-pregnene-3β,19-diol-20-one 3-cyclopentylpropionate,
16α-methyl-Δ⁵-pregnene-3β,19-diol-20-one 3-butyrate,
16β-methyl-Δ⁵-pregnene-3β,19-diol-20-one 3-benzoate,
16α-methyl-Δ⁵-pregnene-3β,17α,19-triol-20-one 3,17-diacetate,
17,20;20,21-bismethylenedioxy-Δ⁵-pregnene-3β,19-diol 3-acetate,
16α,17α-isopropylidenedioxy-Δ⁵-pregnene-3β,19,21-triol-20-one 3,21-diacetate,
17,20;20,21-bismethylenedioxy-Δ⁵-pregnene-3β,19-diol-11-one 3-propionate,
16α,17α-isopropylidenedioxy-Δ⁵-pregnene-3β,19,21-triol-11,20-dione 3,21-diacetate,
17,20;20,21-bismethylenedioxy-16α-methyl-Δ⁵-pregnene-3β,19-diol 3-acetate,
17,20;20,21-bismethylenedioxy-16β-methyl-Δ⁵-pregnene-3β,19-diol 3-acetate,
17,20;20,21-bismethylenedioxy-16α-methyl-Δ⁵-pregnene-3β,19-diol-11-one 3-acetate,
Δ⁵-pregnene-3β,19,21-triol-20-one 3,21-diacetate,
Δ⁵-pregnene-3β,19,21-triol-11,20-dione 3,21-diacetate,
Δ⁵-pregnene-3β,17α,19,21-tetrol-20-one 3,17,21-triacetate,
Δ⁵-pregnene-3β,17α,19,21-tetrol-11,20-dione 3,17,21-triacetate,
16α-methyl-Δ⁵-pregnene-3β,17α,19,21-tetrol-20-one 3,17,21-triacetate,
16α-methyl-Δ⁵-pregnene-3β,17α,19,21-tetrol-11,20-dione 3,17,21-triacetate, and the like.

In practicing the process as outlined in the above reaction sequence, the 19-hydroxyl group of a 3-acyloxy-Δ⁵-19-hydroxy steroid (I), such as Δ⁵-androstene-3β,17β,19-triol 3,17-diacetate, is tosylated under conventional conditions, e.g., by reacting the starting material with tosyl chloride in pyridine at a temperature of from about 0° C. to about 40° C. for from about 24 hours to about 96 hours, and preferably at room temperature (about 20–25° C.) for about 72 hours, to provide the corresponding 3-acyloxy-Δ⁵-19-tosyloxy-intermediate (II), e.g., Δ⁵-androstene-3β,17β,19-triol 3,17-diacetate 19-tosylate. Parenthetically, it should be noted that besides tosyl chloride, other similar reagents, e.g., methane sulfonyl chloride, benzene-sulfonyl chloride, and the like can be employed to esterify the 19-hydroxyl group, and also that other solvents, e.g., collidine, lutidine, and the like, as well as mixtures thereof, can be used in addition to or instead of pyridine.

The thus produced 19-tosyloxy intermediate (II) is next reacted with an alkali metal acylate wherein the acyloxy moiety is derived from a saturated aliphatic hydrocarbon monocarboxylic acid having from 2 to 8 or more carbon atoms, such as lithium acetate, sodium acetate, potassium acetate, sodium propionate, potassium propionate, lithium butyrate, sodium valerate, potassium caproate, lithium enanthate, sodium caprylate, and the like, to produce the corresponding 3-acyloxy-5β,19-cyclo-6α-hydroxy compound (III), e.g., 5β,19-cycloandrostane-3β,6α,17β-triol 3,17- diacetate being produced from Δ⁵-androstene-3β,17β,19-triol 3,17-diacetate 19-tosylate. This reaction will be conducted at a temperature of from about 50° C. to about 100° C., and preferably at a temperature of from about 55° C. to about 75° C., for about 24 hours to about 72 hours, in an inert organic solvent such as acetone, dioxane, tetrahydrofuran, diglyme, and the like, as well as mixtures thereof. The amount of alkali metal acylate employed can range from about 3 molar equivalents to about 12 molar equivalents, and preferably from about 5 to about 7 molar equivalents by weight, per molar equivalent of the steroid reactant.

The acyloxy grouping at C-3, may be saponified conventionally, e.g., with sodium hydroxide, sodium carbonate, etc., to give the corresponding 3-free alcohols.

The novel process of the present invention for the production of 19-hydroxy-Δ⁵-steroids is exemplified by the following scheme, wherein only the A and B rings are represented:

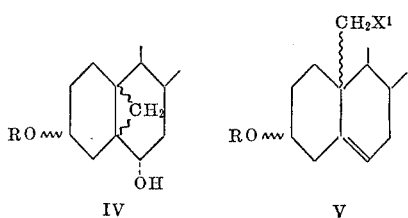

IV     V

In the above formulae, R, R¹ and ₹ have the same meaning as set forth hereinbefore.

The starting compounds for the present process (IV) are 3,6-dihydroxy-5,19-cyclo steroid derivatives, preferably of the androstane or pregnane series. As it is indicated in Formula IV, these starting compounds may have the methylene group attached to the 5 and 10 position, either at the α face of the molecule or at the β face. The preparation of the β-isomers, i.e., the 5β,19-cyclo-10β-steroids, was described hereinbefore. On the other hand, the α-isomers, i.e., the 5α,19-cyclo-10α-steroids may be prepared from the corresponding 6α-hydroxy-Δ⁵⁽¹⁰⁾-19-nor-steroids, by treatment with iodo-methyl-zinc iodide in the absence of alkyl iodides, in accordance with U.S. patent application Ser. No. 441,318 filed Mar. 19, 1965, now abandoned.

In proceeding in accordance with the latter scheme, the starting 5,19-cyclo-6-hydroxy steroid is treated with a hydrogen halide, such as hydrogen fluoride, hydrogen chloride, or hydrogen bromide, for a period of time that may range between about 30 minutes to about 72 hours, at a temperature comprised between about −80° C. and about 100° C., in a non-basic inert organic solvent, such as a lower alkanol, e.g., methanol, ethanol, etc., a lower hydrocarbon ether, for example, tetrahydrofuran, dioxane, ethylether, etc., a lower homocyclic aromatic hydrocarbon, e.g., benzene, toluene, etc., a lower halogenated hydrocarbon, for example, chloroform, methylene chloride, etc., mixtures thereof or the like, to give the corresponding 19-halo-Δ⁵-10α or 10β-steroid (V). The amount of hydrogen halide used in this reaction is comprised between about 1 and 40 molar equivalents.

For obtaining better yields in the reaction dealt with, it is generally advisable to carry it out in the presence of a source of the corresponding halide ions, such as an alkali metal or alkaline earth metal halide, e.g., lithium chloride, sodium chloride, magnesium chloride, lithium fluoride, lithium bromide or the like. The amount of halide ion source used may range between about 0.1 to about 20 molar equivalents.

Primary and secondary hydroxyl groups in the 19-halo steroids prepared by the process of the present invention, i.e., a 21-hydroxyl group, a 3β-hydroxyl group, a 16α-hydroxyl group or a 17β-hydroxyl group where there is no substituent at the 17α-position, are esterified by conventional procedures involving acylation in pyridine with a chloride, e.g., acetyl chloride, or anhydride, e.g., acetic anhydride, of an acid of the type described hereinabove. Tertiary hydroxyl groups in these 19-halo steroids, i.e., a 17α-hydroxyl group in a pregnene, are also esterified by conventional procedures, e.g., by treatment with an anhydride of an acid of the type described hereinabove in the presence of p-toluenesulfonic acid.

The 19-halo-16α,17α-acetal and ketal derivatives and 19-halo-17,20;20,21-bismethylenedioxy derivatives prepared by the process of the present invention can be converted into the corresponding 19-halo-16α,17α-dihydroxy and 19-halo-17α,21-diol-20-one derivatives, respectively, by conventional treatment with formic acid.

The following specific examples serve to illustrate but are not intended to limit the scope of the present invention.

PREPARATION 1

A solution of 1 g. of 17α-methyl-Δ⁵⁽¹⁰⁾-estren-17β-ol-3,6-dione, in 50 cc. of tetrahydrofuran was added over a period of 30 minutes to a stirred suspension of 1 g. of lithium aluminum hydride and 50 cc. of anhydrous tetrahydrofuran. The mixture was heated to reflux during 2 hours, then it was cooled and treated cautiously with 50 cc. of ethyl acetate and 2 cc. of water. Solid sodium sulfate was added and the inorganic material was filtered off and washed conscientiously with hot ethyl acetate, the combined organic solutions produced by evaporation a crude material, which was purified by crystallization from acetone-hexane thus giving 17α-methyl-Δ⁵⁽¹⁰⁾-esterene-3α,6α,17β-triol.

17α-ethyl-Δ⁵⁽¹⁰⁾-estren-17β-ol-3,6-dione was treated by the same procedure to give 17α-ethyl-Δ⁵⁽¹⁰⁾-estrene-3α,6α,17β-triol.

PREPARATION 2

The compounds specified hereinafter under I obtained according to Bowers et al., U.S. patent application Ser. No. 293,891, filed July 9, 1963, now U.S. Patent No. 3,314,943, from the corresponding 19-hydroxy-Δ⁵-compounds by treatment with chromium trioxide in pyridine, were treated according to Preparation 1 to give the corresponding products listed under II:

| I | II |
|---|---|
| The acetate of Δ⁵⁽¹⁰⁾-estren-3β-ol-6,17-dione. | Δ⁵⁽¹⁰⁾-estrene-3β, 6α,17β-triol. |
| The 3-acetate of 17α-methyl-Δ⁵⁽¹⁰⁾-estrene-3β,17β-diol-6-one. | 17α-methyl-Δ⁵⁽¹⁰⁾-estrene-3β,6α,17β-triol. |
| The acetate of Δ⁵⁽¹⁰⁾-19-nor-pregnen-3β-ol-6,20-dione. | Δ⁵⁽¹⁰⁾-19-nor-pregnene-3β,6α,20β-triol. |
| The acetate of 17,20;20,21-bismethylenedioxy-Δ⁵⁽¹⁰⁾-19-nor-pregnen-3β-ol-6-one. | 17,20;20,21-bismethylenedioxy-Δ⁵⁽¹⁰⁾-19-nor-pregnene-3Δ,6α-diol. |

PREPARATION 3

A mixture of 4 g. of methylene iodide, 1 g. of zinc copper couple (prepared according to H. E. Simons and R. D. Smith, J. Am. Chem. Soc., 81, 4256 (1959)) and 20 cc. of ethyl ether in 20 cc. of ethyl ether were boiled under reflux during 1 hour. The resulting mixture was filtered and the filtrate was added to a solution of 1 g. of 17α-methyl-Δ⁵⁽¹⁰⁾-estrene-3α,6α,17β-triol in 20 cc. of ethyl ether. The whole was boiled under reflux during 1 hour, then 15 cc. of solvent were evaporated and the liquid residue was introduced into a sealed tube, which was maintained at 100° C. during 2 hours. The tube was cooled, the content was diluted with ether, washed successively with a 10% ammonium chloride solution, a 5% sodium carbonate solution, then with water to neutral, dried over sodium sulfate and evaporated to dryness.

The solid residue was chromatographed on a column of 20 g. of alumina thus giving 17α-methyl-5α,10α-methylene-estrane-3α,6α,17β-triol (17α-methyl-5α,19-cyclo-10α-androstane-3α,6α,17β-triol).

The starting compounds listed under I were treated by the same procedure, thus affording the corresponding products set forth under II:

| I | II |
|---|---|
| 17α-ethyl-Δ$^{5(10)}$-estrene-3α,6α,17β-triol. | 17α-ethyl-5α,10α-methylene-estrane-3α,6α,17β-triol. |
| Δ$^{5(10)}$-estrene-3β,6α,17β-triol. | 5α-10α-methylene-estrane-3β, 6α, 17β-triol. |
| 17α-methyl-Δ$^{5(10)}$-estrene-3β,6α,17β-triol. | 17α-methyl-5α,10α-methylene-estrane-3β,6α,17β-triol. |
| Δ$^{5(10)}$-19-nor-pregnene-3β-6α,20β-triol. | 5α,10α-methylene-19-nor-pregnane-3β,6α,20β-triol. |
| 17,20;20,21-bismethylenedioxy-Δ$^{5(10)}$-19-nor-pregnene-3β,6α-diol. | 17,20;20,21-bismethylenedioxy-5α,10α-methylene-19-nor-pregnane-3β,6α-diol. |

Example I

To a solution of 2.5 grams of tosyl chloride in 25 cc. of pyridine, contained in a suitable reaction vessel, there were added, with stirring, 5 grams of Δ$^5$-androstene-3β, 19-diol-17-one 3-acetate. The resulting reaction mixture was held at room temperature (about 25° C.) for 24 hours. Then, the reaction mixture was diluted with water and the resulting precipitate of Δ$^5$-androstene-3β,19-diol-17-one 3-acetate 19-tosylate was separated by filtration.

Examples II–X

The procedure of Example I was repeated in every detail in each of these examples, except for the following. A different 19-hydroxy steroid, namely, Δ$^5$-androstene-3β,17β,19-triol 3,17-diacetate;
17α-methyl-Δ$^5$-androstene-3β,17β,19-triol, 3,17-diacetate;
16α-methyl-Δ$^5$-pregnene-3β,17α,19-triol-20-one 3,17-diacetate;
16α,17α-isopropylidenedioxy-Δ$^5$-pregnene-3β,19-diol-20-one 3-cyclopentylpropionate;
17,20;20,21-bismethylenedioxy-Δ$^5$-pregnene-3β,19-diol 3-acetate;
17,20;20,21-bismethylenedioxy-16α-methyl-Δ$^5$-pregnene-3β,19-diol-11-one 3-acetate;
17,20;20,21-bismethylenedioxy-16α-methyl-Δ$^5$-pregnene-3β,19-diol-11-one 3-acetate;
Δ$^5$-pregnene-3β,19,21-triol-11,20-dione 3,21-diacetate and
16α-methyl-Δ$^5$-pregnene-3β,17α,19,21-tetrol-20-one 3,17,21-triacetate, respectively, was employed in each example in place of Δ$^5$-androstene-3β,19-diol-17-one 3-acetate. In addition, in Examples V–VII, inclusive, tosyl chloride was replaced by equivalent amounts of mesyl chloride. The resulting 19-tosylates and 19-mesylates, namely, Δ$^5$-androstene-3β,17β,19-triol 3,17-diacetate 19-tosylate;
17α-methyl-Δ$^5$-androstene-3β,17β,19-triol 3,17-diacetate 19-tosylate;
16α-methyl-Δ$^5$-pregnene-3β,17α,19-triol-20-one, 3,17-diacetate 19-tosylate;
16α,17α-isopropylidenedioxy-Δ$^5$-pregnene-3β,19-diol-20-one 3-cyclopentylpropionate 19-mesylate;
17,20;20,21-bismethylenedioxy-Δ$^5$-pregnene-3β,19-diol 3-acetate 19-mesylate;
17,20;20,21-bismethylenedioxy-16β-methyl-Δ$^5$-pregnene-3β,19-diol 3-acetate 19-mesylate;
17,20;20,21-bismethylenedioxy-16α-methyl-Δ$^5$-pregnene-3β,19-diol-11-one 3-acetate 19-tosylate;
Δ$^5$-pregnene-3β,19,21-triol-11,20-dione 3,21-diacetate 19-tosylate and
16α-methyl-Δ$^5$-pregnene-3β,17α,19,21-tetrol-20-one 3,17,21-triacetate 19-tosylate, respectively, were removed from the respective reaction media by dilution with water and filtration of the resulting precipitates.

Example XI

To a solution of 6 grams of sodium acetate dissolved in 50 ml. of water, contained in a suitable reaction vessel equipped with thermometer, stirred and reflux condenser, there was added a solution of 4 grams of Δ$^5$-androstene-3β,19-diol-17-one 3-acetate 19-tosylate dissolved in 115 ml. of acetone. The resulting reaction mixture was refluxed for 22 hours, following which the bulk of the acetone was removed therefrom by vacuum distillation. Next, 50 ml. of water were added to the reaction mixture, and the product was then isolated therefrom by the addition of methylene chloride. After removal of the solvent and crystallization from acetone:hexane (1:1), 1.6 grams of 5β,19-cycloandrostane-3β,6α-diol-17-one 3-acetate were obtained.

Examples XII–XX

The procedure of Example XI was repeated in every detail in each of these examples except for the following. The starting steroid was replaced, in turn, by the 19-tosylates and 19-mesylates of Examples II–X, respectively. In addition, in Examples XIII–XVIII, inclusive, sodium acetate was replaced by equivalent amounts of lithium acetate, potassium acetate, sodium propionate, lithium butyrate, sodium valerate and sodium caprylate, respectively. Finally, the solvent employed in Examples XIII–XVI, inclusive, was tetrahydrofuran, while dioxane and diglyme were the solvents used in Examples XVII and XVIII, respectively. These various modifications resulted in the formation of 5β,19-cycloandrostane-3β,6α,17β-triol, 3,17-diacetate;
17α-methyl-5β,19-cycloandrostan-3β,6α,17β-triol 3,17-diacetate;
16α-methyl-5β,19-cyclopregnane-3β,6α,17α-triol-20-one, 3,17-diacetate;
16α,17α-isopropylidenedioxy-5β,19-cyclopregnane-3β,6α-diol-20-one 3-cyclopentylpropionate;
17,20;20,21-bismethylenedioxy-5β,19-cyclopregnane-3β,6α-diol 3-acetate;
17,20;20,21-bismethylenedioxy-16β-methyl-5β,19-cyclopregnane-3β,6α-diol 3-acetate;
17,20;20,21-bismethylenedioxy-16α-methyl-5β,19-cyclopregnane-3β,6α-diol-11-one 3-acetate;
5β,19-cyclopregnane-3β,6α,21-triol-11,20-dione 3,21-diacetate and
16α-methyl-5β,19-cyclopregnane-3β,6α,17α,21-tetrol-20-one 3,17,21-triacetate, respectively.

Example XXI

To a substantially anhydrous mixture of 5 grams of hydrogen fluoride and 10 grams of tetrahydrofuran maintained at −70° C. in a suitable reaction vessel equipped with thermometer, stirrer and cooling means, there was added with stirring, a substantially anhydrous solution of 1 gram of 5β,19-cycloandrostane-3β,6α-diol-17-one 3-acetate in 50 ml. of dried methylene chloride. After maintaining the resulting reaction mixture at −70° C. for one hour, the temperature was raised to −20° C., and the reaction mixture was held at that temperatue for 24 hours. Following this reaction period, the reaction mixture was poured into an excess of a 10% aqueous sodium carbonate solution and the product was isolated therefrom with methylene chloride, which was then washed to neutral with water, dried and concentrated. Chromatography on alumina followed by crystallization from methanol gave 350 mg. of 19-fluoro-Δ$^5$-androsten-3β-ol-17-one 3-acetate.

Examples XXII–XXX

The procedure of Example XXI was repeated in every detail in each of these examples except for the following. The starting steroid was replaced, in turn, by the 5β,19-cycloandrostanes and 5β,19-cyclopregnanes of Examples XII–XX, respectively. In addition, in Examples XXIV–XXVIII, hydrogen fluoride was replaced by equivalent amounts of hydrogen chloride, hydrogen bromide, a 1:1 (molar equivalents) mixture of hydrogen fluoride and lithium fluoride, a 1:3 (molar equivalents) mixture of hydrogen chloride and lithium chloride, and a 1:5 (molar equivalents) mixture of hydrogen bromide and magnesium bromide, respectively. Finally, in Examples XXIV, XXV, XXVII and XXVIII, tetrahydrofuran was replaced by equivalent amounts of methylene chloride, chloroform, dioxane, and a 1:1 mixture of tetrahydrofuran and methylene chloride, respectively. These various modifications resulted in the formation of 19-fluoro-Δ⁵-androstene-3β,17β-diol 3,17-diacetate; 19-fluoro-17α-methyl-Δ⁵-androstene-3β,17β-diol 3,17-diacetate; 19-chloro-16α-methyl-Δ⁵-pregnene-3β,17α-diol-20-one 3,17-diacetate; 16α,17α-isopropylidenedioxy - 19 - bromo-Δ⁵-pregnen-3β-ol-20-one 3-cyclopentylpropionate; 17,20;20,21 - bismethylenedioxy - 19-fluoro-Δ⁵-pregnen-3β-ol 3-acetate; 17,20;20,21-bismethylenedioxy - 19-chloro - 16β-methyl-Δ⁵-pregnen-3β-ol 3-acetate; 17,20;20, 21 - bismethylenedioxy-19-bromo-16α-methyl-Δ⁵-pregnen-3β-ol-11-one 3-acetate; 19-fluoro-Δ⁵-pregnene-3β,21-diol-11,20-dione, 3,21-diacetate and 19-fluoro-16α-methyl-Δ⁵-pregene - 3β,17α,21 - triol-20-one 3,17,21-triacetate, respectiveively.

Example XXXI

A solution of 1 gram of 19-fluoro-Δ⁵-androsten-3β-ol-17-one 3-acetate in a mixture of 30 cc. of commercial xylene and 10 cc. of cyclohexanone, contained in a suitable reaction vessel equipped with thermometer, distillation column and dropping funnel, was distilled until 10 ml. of solvent had been removed, in order to remove moisture. Next, while continuing distillation, a solution of 1 gram of aluminum isopropoxide in 5 cc. of xylene was added dropwise to the distilling steroid solution over a 5 minute period, and distillation was then continued for an additional 45 minutes. The reaction mixture was then cooled and diluted with water, and the solvents were then removed by steam distillation. The resulting solid was collected by filtration on Celite and then dried. Extraction of the filtrate with hot acetone, followed by crystallization from acetone, gave 19-fluoro-Δ⁴-androstene-3,17-dione.

Example XXXII

To an ice-cooled solution of 1 gram of 17,20:20,21-bismethylenedioxy - 19 - bromo - 16α-methyl-Δ⁵-pregnen-3β-ol-11-one 3-acetate in 120 cc. of methanol there was added 1 gram of sodium borohydride in 3 cc. of water. The resulting reaction mixture was allowed to stand at room temperature for 16 hours, following which excess sodium borohydride was decomposed by the addition of acetic acid and the solution concentrated under vacuum to a small volume, which was then diluted with water. The product was extracted from this dilute solution with ethyl acetate and the resulting extract was washed with water, dried and evaporated. The thus-obtained solid residue was purified by crystallization from acetone-hexane to give a good yield of 17,20:20,21-bismethylenedioxy-19-bromo-16α-methyl-Δ⁵-pregnene-3β,11β-diol 3-acetate.

Example XXXIII

A mixture of 500 mg. of 17α-methyl-5α,10α-methyleneestrane - 3α,6α,17β-triol (17α-methyl-5α, 19-cyclo-10α-androstane-3α,6α,17β-triol), 7 g. of lithium chloride, 3 cc. of 36% hydrochloric acid and 70 cc. of ethanol was kept on the steam bath for 1 hour. The resulting mixture was then poured into water, the former precipitate filtered off, washed with water and dried. Crystallization from acetone-hexane, gave 19-chloro-17α-methyl-Δ⁵-10α-androstene-3α,17β-diol.

The starting compounds listed under I were treated according to the latter procedure, to give the corresponding products set forth under II:

| I | II |
|---|---|
| 17α-ethyl-5α, 10α-methylene-estrane-3α, 6α, 17β-triol. | 19-chloro-17α-ethyl-Δ⁵-10α-androstene-3α, 17β-diol. |
| 5α, 10α-methylene-estrane-3β, 6α, 17β-triol. | 19-chloro-Δ⁵-10α-androstene-3β, 17β-diol. |
| 17α-methyl-5α, 10α-methylene-estrane-3β, 6α, 17β-triol. | 19-chloro-17α-methyl-Δ⁵-10α-androstene-3β, 17β-diol. |
| 5α, 10α-methylene-19-nor-pregnane-3β, 6α, 20β-triol. | 19-chloro-Δ⁵-10α-pregnene-3β, 20β-diol. |
| 17,20;20,21-bismethylenedioxy-5α, 10α-methylene-19-nor-pregnane-3β, 6α-diol. | 19-chloro-17,20;20,21-bismethylenedioxy-Δ⁵-10α-pregnen-3β-o ↦ |

Example XXXIV

The procedure described in Example XXXIII was repeated, except that instead of lithium chloride and hydrochloric acid, there was respectively used lithium bromide and hydrobromic acid, thus producing the corresponding 19-bromo-derivatives.

Example XXXV

A suspension of 1 g. of 5β,19-cyclo-androstane-3β,6α,17β-triol 3,17-diacetate in 60 cc. of methanol was treated with a solution of 1 g. of potassium carbonate in 6 cc. of water; the mixture was boiled under reflux for 1 hour and then cooled in ice and diluted with water. The formed precipitate was collected and recrystallized from acetone-hexane to yield 5β,19-cyclo-androstane-3β,6α,17β-triol.

The primary and secondary acyloxy groups of the rest of the compounds obtained according to Examples XII to XXX, inclusive, were hydrolyzed to the corresponding free hydroxyls by the same procedure.

I claim:

1. A compound of the following formula:

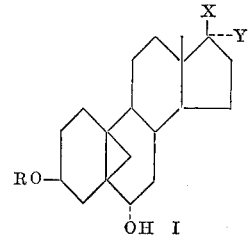

wherein R is selected from the group consisting of hydrogen and a hydrocarbon carboxylic acyl group of less than 12 carbon atoms, X is a member of the group consisting of a hydroxyl and a hydrocarbon carboxylic acyloxy group of less than 12 carbon atoms; and Y is selected from the group consisting of hydrogen, lower alkyl, lower alkenyl and lower alkinyl; and X and Y taken together represent a keto group.

2. 5β,19-cycloandrostane-3β,6α-diol-17-one-3-acetate.

3. A compound of the following formula:

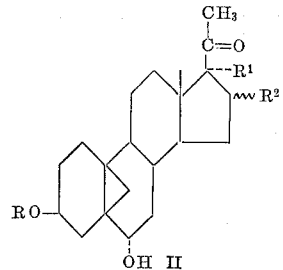

wherein R is selected from the group consisting of hydrogen and a hydrocarbon carboxylic acyl group of less than 12 carbon atoms; R¹ is selected from the group consisting of hydrogen, hydroxyl and a hydrocarbon carboxylic acyloxy group containing less than 12 carbon atoms; R² is a member of the group consisting of hydrogen, methyl, α-hydroxyl and an α-acyloxy group containing less than 12 carbon atoms; and $R^1$ and $R^2$ taken together represent the group

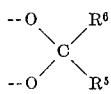

wherein $R^5$ and $R^6$ are each selected from the group consisting of hydrogen and a lower hydrocarbon radical.

4. 16α - methyl - 5,19-cyclo-pregnane-3β,6α,17α-triol-20-one, 3,17-diacetate.

5. A compound of the following formula:

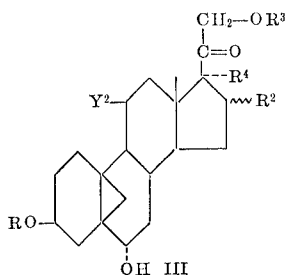

wherein R is selected from the group consisting of hydrogen and a hydrocarbon carboxylic acyl group of less than 12 carbon atoms; $R^2$ is a member of the group consisting of hydrogen, methyl, α-hydroxyl and an α-acyloxy group containing less than 12 carbon atoms; $R^3$ is selected from the group consisting of hydrogen and a hydrocarbon carboxylic acyl group of less than 12 carbon atoms; $R^4$ is selected from the group consisting of a hydrocarbon carboxylic acyloxy group of less than 12 carbon atoms and a hydroxyl group; $R^2$ and $R^4$ taken together represent the grouping

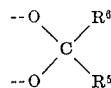

wherein $R^5$ and $R^6$ are each selected from the group consisting of hydrogen and a lower hydrocarbon radical; and $Y^2$ is selected from the group consisting of a keto group and hydrogen; $R^4$ and $OR^3$ taken together with the 20-keto group represent a 17,20;20,21-bismethylenedioxy grouping.

6. 17,20;20,21 - bismethylenedioxy-16α-methyl-5β,19-cyclo-pregnane-3β,6α-diol-11-one-3-acetate.

7. A compound of the following formula:

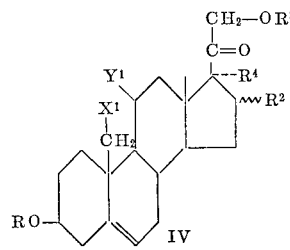

wherein R is selected from the group consisting of hydrogen and a hydrocarbon carboxylic acyl group of less than 12 carbon atoms; $R^2$ is selected from the group consisting of hydrogen, methyl, α-hydroxyl and an α-acyloxy group containing less than 12 carbon atoms; $R^3$ is selected from the group consisting of hydrogen and a hydrocarbon carboxylic acyl group of less than 12 carbon atoms; $R^4$ is selected from the group consisting of hydroxyl and an acyloxy group of less than 12 carbon atoms; and $R^2$ and $R^4$ taken together represent the grouping

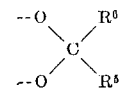

wherein $R^5$ and $R^6$ are each selected from the group consisting of hydrogen and a lower hydrocarbon radical; $OR^3$ and $R^4$ taken together with the 20-keto group, represent a 17,20;20,21-bismethylenedioxy grouping; $X^1$ is selected from the group consisting of fluorine, chlorine and bromine; and $Y^1$ is selected from the group consisting of hydrogen, β-hydroxyl and keto.

8. 17,20;20,21 - bismethylenedioxy - 19 - bromo - 16α-methyl-Δ⁵-pregnen-3β-ol-11-one-3-acetate.

9. 19 - fluoro - 16α - methyl - Δ⁵ - pregnene - 3β,17α,21-triol-20-one, 3,17,21-triacetate.

10. A process for the production of a 19-halo-Δ⁵-steroid selected from the group consisting of 10α-androstanes, 10β-androstanes, 10α-pregnanes and 10β-pregnanes, which comprises treating the corresponding 5,19-cyclo-6α-hydroxy compound with the corresponding hydrogen halide.

11. The process of claim 10 wherein the reaction is carried out in the presence of a source of the corresponding halide ion.

12. The process of claim 11 wherein the source of halide ion is the corresponding alkali metal halide.

13. The process of claim 11 wherein the source of halide ion is an alkaline earth metal halide.

14. The process of claim 10 wherein the reaction is carried out at a temperature comprised between about −80° C. and about 100° C., for a period of time that may range between about 30 minutes to about 72 hours, in a non basic inert organic solvent.

15. The process of claim 14 wherein the non basic inert organic solvent is selected from the group consisting of lower alkanol, lower hydrocarbon ether, lower homocyclic aromatic hydrocarbon, and halogenated lower hydrocarbon.

16. The process of claim 10 wherein the hydrogen halide is hydrogen fluoride.

17. The process of claim 10 wherein the hydrogen halide is hydrogen chloride.

18. The process of claim 10 wherein the hydrogen halide is hydrogen bromide.

19. The process of producing steroids with a partial structure of

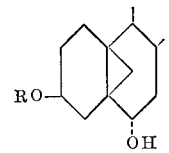

wherein R is a lower hydrocarbon carboxylic acyl group comprising treating a steroid with the partial structure of

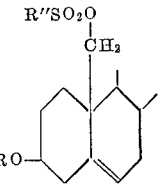

wherein R is as defined above and R″ is selected from the group consisting of lower alkyl, tolyl and phenyl in an inert organic solvent with an alkali metal acylate in the presence of water.

References Cited

Halpern et al., Steroids, vol. 4, No. 1, July 1964, pp. 1–30.

LEWIS GOTTS, *Primary Examiner.*

E. H. LOVE, *Assistant Examiner.*